United States Patent [19]

Higuchi et al.

[11] Patent Number: 5,541,465
[45] Date of Patent: Jul. 30, 1996

[54] ELECTROSTATIC ACTUATOR

[75] Inventors: Toshiro Higuchi, Yokohama; Toshiki Niino, Tokyo, both of Japan

[73] Assignee: Kanagawa Academy of Science and Technology, Japan

[21] Appl. No.: 424,000

[22] Filed: Apr. 18, 1995

Related U.S. Application Data

[62] Division of Ser. No. 70,700, Jun. 2, 1993, Pat. No. 5,498,124.

[30] Foreign Application Priority Data

Aug. 25, 1992 [JP] Japan .................. 4-225551

[51] Int. Cl.⁶ ................................. H02N 1/00
[52] U.S. Cl. .................. 310/309; 310/40 MM; 310/268
[58] Field of Search .................. 310/309, 308, 310/12.254, 51.261, 17, 22, 40 MM, 268; 318/135

[56] References Cited

U.S. PATENT DOCUMENTS

| 23,460 | 2/1852 | Felki | 310/308 |
|---|---|---|---|
| 4,814,657 | 3/1989 | Yano | 310/309 |
| 4,943,750 | 7/1990 | Howe | 310/309 |
| 5,001,381 | 3/1991 | Watanabe | 310/309 |

FOREIGN PATENT DOCUMENTS 285978  11/1990  Japan .

OTHER PUBLICATIONS

"Electrostatic Film Actuator Prototype with Electrodes in both Stator and Slider", T. Higuchi et al., Apr. 1991, pp. 203, 203; N.C.R. Japan, Sec. 7, (in Japanese).

Niino et al., "Development of Electrostate Actuator . . . " Proceedings on Workshop on Micro El. Mech. Systems: Travemonde 1992; New York, I.E.e.e. 1992, pp. 122–127.

Primary Examiner—R. Skudy
Attorney, Agent, or Firm—Lorusso & Loud

[57] ABSTRACT

An electrostatic actuator according to the present invention includes a first member having a plurality of striped electrodes insulated from one another and arranged in a prescribed direction with a prescribed spacing between them, a second member having a plurality of striped electrodes insulated from one another and arranged in a prescribed direction with a prescribed spacing between them, and continuous-waveform polyphase AC power supplies applied to the electrodes of the first member and the electrodes of the second member, one or both of the first member and second member being moved by an electrostatic coulomb force between the first member and the second member.

10 Claims, 11 Drawing Sheets

$U_1 = U_2 + U_a$

FIG. 5(a)
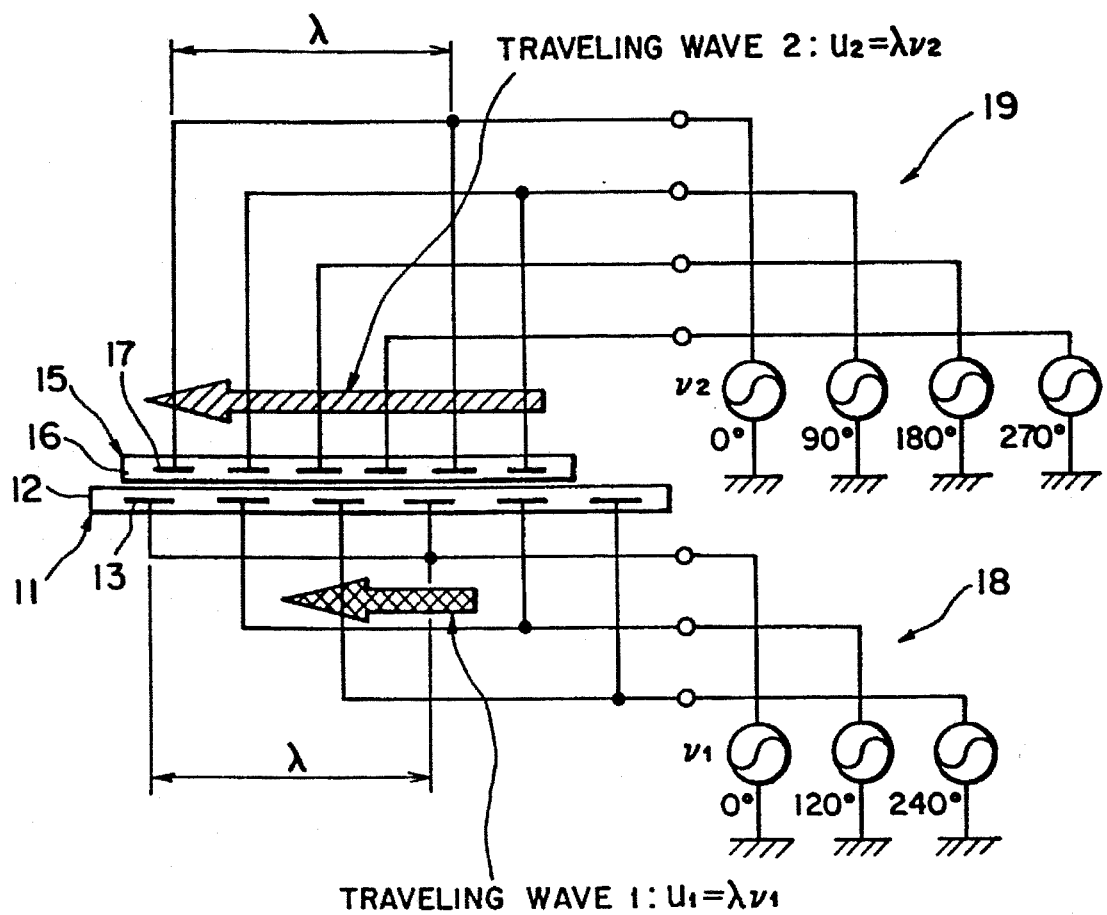
FIG. 5(b)

FIG. 6(a)
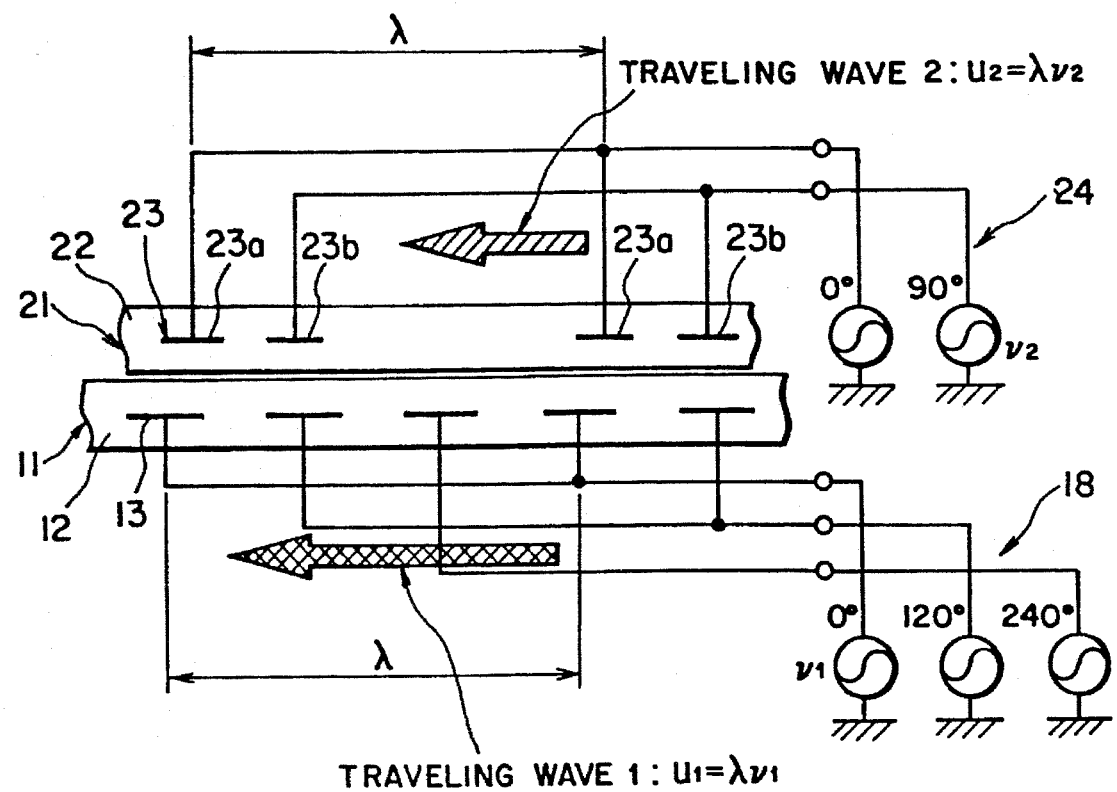
FIG. 6(b)
DRIVING VELOCITY $U_a=U_1-U_2$   TRAVELING WAVE 2
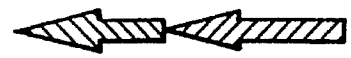
TRAVELING WAVE 1
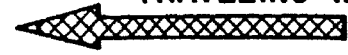

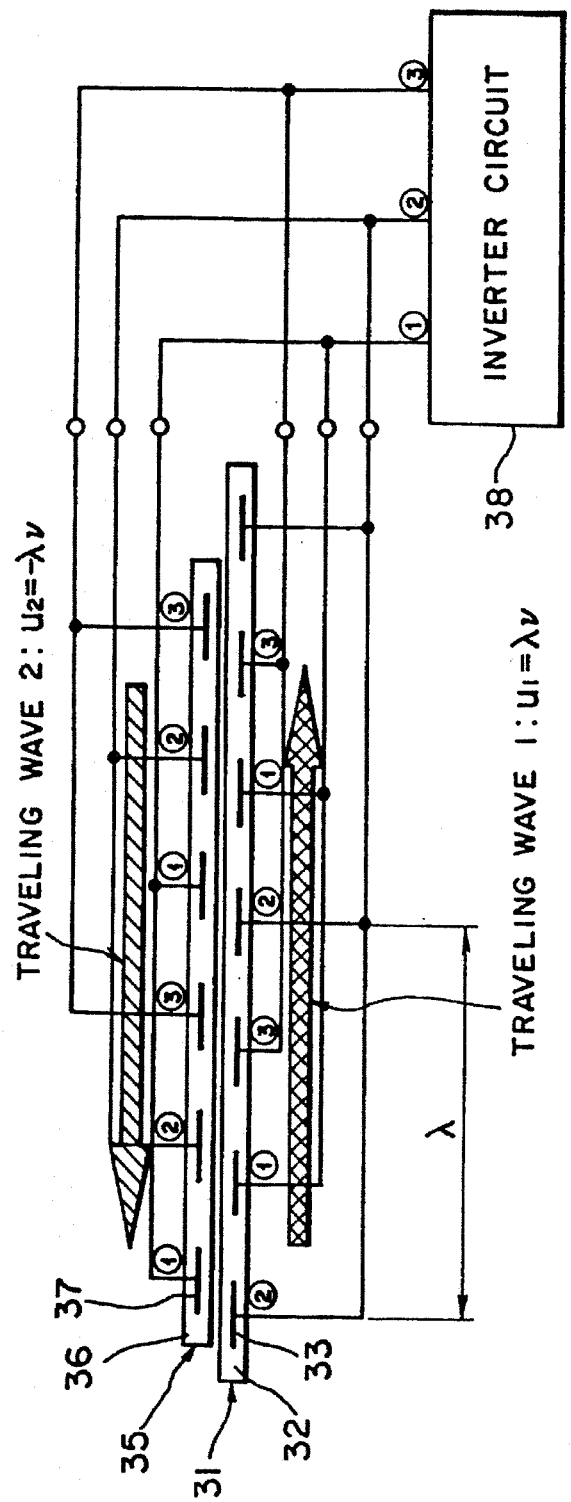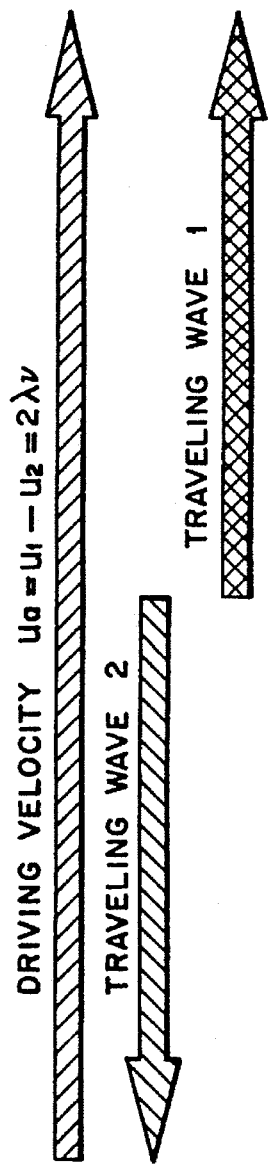
FIG.7(a)
FIG.7(b)

5,541,465

ELECTROSTATIC ACTUATOR

This application is a division of application Ser. No. 08/070,700, filed Jun. 2, 1993, now U.S. Pat. No. 5,448,124.

BACKGROUND OF THE INVENTION

This invention relates to an electrostatic actuator in which an electrostatic force serves as the source of power.

Conventional electrical actuators mainly employ electromagnetic force as the source of driving power. However, since actuators of this type rely upon a permanent magnet or electromagnetic coil of great weight, the power density, which is the most important performance index of an actuator, is small. Furthermore, since a large current is required, a large amount of heat is generated.

Various electrostatic actuators have been proposed in order to solve these problems. With conventional electrostatic actuators, however, the following difficulties are encountered:

(a) The conventional electrostatic actuator has a stator and a slider, and an attractive force is produced between them. Consequently, it is difficult to achieve practical operation unless use is made of a mechanism for reducing frictional force.

(b) A mechanism for maintaining an optimum spacing between the stator and the slider is required.

For these reasons, the conventional electrostatic actuator is of great weight and therefore the key advantage of an electrostatic actuator, namely the possibility of producing a large force with an actuator of light weight, cannot be exploited.

In an effort to eliminate these difficulties, the inventors of this application have previously proposed an electrostatic actuator that utilizes a film, as disclosed in the specification of Japanese Patent Application Laid-Open (KOKAI) No. 2-285978.

Further, an electrostatic actuator capable of solving the above-mentioned problems has been disclosed in a paper entitled "Electrostatic Film Actuator Prototype with Electrodes in both Stator and Slider" by T. Higuchi, S. Egawa, T. Niino and N. Nishiguchi, 1991 *National Convention Record I.E.E. Japan*, Section 7, April 1991, pp. 202–203 (in Japanese). Since this actuator iS operated by an electrostatic repulsive force produced between the stator and slider, the two problems mentioned above are solved. However, since this actuator is such that excitations of electrodes are changed over by switches, problems arise in that it is necessary to apply high DC voltages and in that a major part of the electrical energy supplied changes to heat within the switches, as a result of which efficiency is poor.

In another proposal, a closed-loop control-type electrostatic actuator having a position sensor is provided. The sensor employs current detectors connected to three-phase electrodes in the stator and four-phase high-frequency AC voltages connected to four-phase electrodes in the slider.

Thus, as set forth above, the electrostatic actuators of the prior art involve a number of problems, namely the problem of frictional force and the mechanism for eliminating it, the problem relating to the mechanism for maintaining the optimum spacing between the stator and slider, the problem of the large-scale auxiliary equipment needed for drive, such as the power supply, and such problems as the fact that a position sensor is needed, the driving force is too small and the energy efficiency is low.

SUMMARY OF THE INVENTION

The present invention has been devised in view of these problems and its object is to provide a light-weight, simply constructed and highly efficient electrostatic actuator that is capable of obtaining a large driving force.

According to the present invention, the foregoing object is attained by providing an electrostatic actuator comprising a first member having a plurality of striped electrodes insulated from one another and arranged in a prescribed direction with a prescribed spacing between them, a second member having a plurality of striped electrodes insulated from one another and arranged in a prescribed direction with a prescribed spacing between them, and continuous-waveform polyphase AC power supplies applied to the electrodes of the first member and the electrodes of the second member, one or both of the first member and second member being moved by an electrostatic Coulomb force between the first member and the second member.

In another embodiment of the invention, the foregoing object is attained by providing an electrostatic actuator comprising a first element member having a plurality of striped electrodes insulated from one another and arranged in a prescribed direction with a prescribed spacing between them, a first connecting body for connecting a plurality of the first element members with a prescribed spacing between them, a first continuous-waveform polyphase AC power supply applied to the electrodes of the first element member, a second element member having a plurality of striped electrodes insulated from one another and arranged in a prescribed direction with a prescribed spacing between them, a second connecting body for connecting a plurality of the second element members with a prescribed spacing between them, and a second continuous-waveform polyphase AC power supply applied to the electrodes of the second element member, one or both of the first element member and second element member being moved by an electrostatic Coulomb force between the first element member and the second element member.

In another embodiment of the invention, the foregoing object is attained by providing an electrostatic actuator comprising a first disk-shaped member having a plurality of striped electrodes insulated from one another and arranged in radiating form with a prescribed spacing between them, a second disk-shaped member disposed concentrically with respect to the first disk-shaped member and having a plurality of striped electrodes insulated from one another and arranged in radiating form with a prescribed spacing between them, and continuous-waveform polyphase AC power supplies applied to the plurality of striped electrodes arranged in radiating form on the first disk-shaped member and the plurality of striped electrodes arranged in radiating form on the second disk-shaped member, one or both of the first disk-shaped member and the second disk-shaped member being rotatively moved by an electrostatic Coulomb force between the first disk-shaped member and the second disk-shaped member.

In yet another embodiment of the invention, the foregoing object is attained by providing an electrostatic actuator comprising a cylindrical member having a plurality of winding-shaped electrodes insulated from one another and arranged in a prescribed direction with a prescribed spacing between them, a tubular member disposed coaxially with respect to the cylindrical member and having a plurality of winding-shaped electrodes insulated from one another and arranged in a prescribed direction with a prescribed spacing between them, and continuous-waveform polyphase AC power supplies applied to the plurality of winding-shaped electrodes on the cylindrical member and the plurality of winding-shaped electrodes on the tubular member, one or both of the cylindrical member and the tubular member being slidably moved by an electrostatic Coulomb force between the cylindrical member and the tubular member.

In a further embodiment of the invention, the foregoing object is attained by providing an electrostatic actuator comprising a cylindrical member having a plurality of axially extending striped electrodes insulated from one another and arranged in a prescribed direction with a prescribed spacing between them, a tubular member disposed coaxially with respect to the cylindrical member and having a plurality of axially extending striped electrodes insulated from one another and arranged in a prescribed direction with a prescribed spacing between them, and continuous-waveform polyphase AC power supplies applied to the plurality of striped electrodes on the cylindrical member and the plurality of striped electrodes on the tubular member, one or both of the cylindrical member and the tubular member being rotatively moved by an electrostatic Coulomb force between the cylindrical member and the tubular member.

In accordance with the present invention as described above, traveling waves of potential are produced in the vicinity of the electrodes of first and second members, and a driving force is generated between the first and second members by the electrostatic Coulomb force produced between these two mutually opposing traveling waves, whereby the device functions as an actuator. The Coulomb force becomes a repulsive force at locations where the signs of the potentials between the two traveling waves are equal. Since friction is reduced by this repulsive force even when the first and second members are in a contacting state, the actuator can be driven without provision of a lubricating mechanism.

In particular, by applying continuous-waveform polyphase alternating current to the electrodes of the first member and the electrodes of the second member, two traveling waves of different phases are produced in the first and second members without special provision of an alignment mechanism, and a driving force can be obtained based upon the phase difference.

Furthermore, by connecting the electrodes provided on the first member in three phases and the electrodes provided on the second member in three phases, a commercial three-phase power supply can be utilized as the source of power applied to these electrodes.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5(a) is a diagram for describing the construction and operation of a second embodiment of an electrostatic actuator according to the present invention;

FIG. 5(b) is a diagram for describing traveling waves and driving velocity of the electrostatic actuator according to the second embodiment of the present invention;

FIG. 6(a) is a diagram for describing the construction and operation of a third embodiment of an electrostatic actuator according to the present invention;

FIG. 6(b) is a diagram for describing traveling waves and driving velocity of the electrostatic actuator according to the third embodiment of the present invention;

FIG. 7(a) is a diagram for describing the construction and operation of a fourth embodiment of an electrostatic actuator according to the present invention;

FIG. 7(b) is a diagram for describing traveling waves and driving velocity of the electrostatic actuator according to the fourth embodiment of the present invention;

DESCRIPTION OF THE PREFERRED EMBODIMENTS

Preferred embodiments of the present invention will now be described in detail with reference to the drawings.

Figure 1:
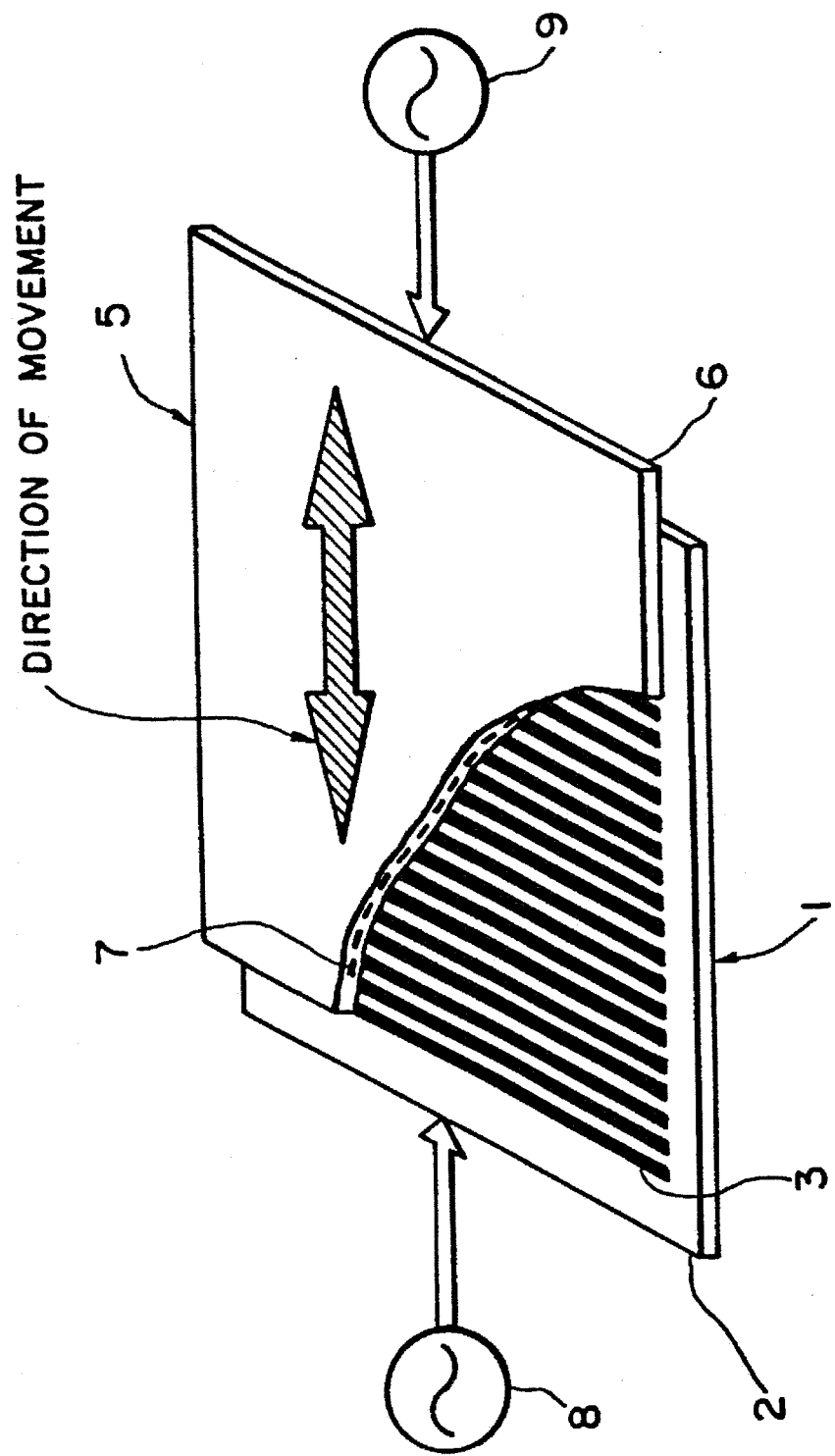
FIG. 1 is a partially broken away schematic perspective view illustrating a first embodiment of an electrostatic actuator according to the present invention.
Figure 2:
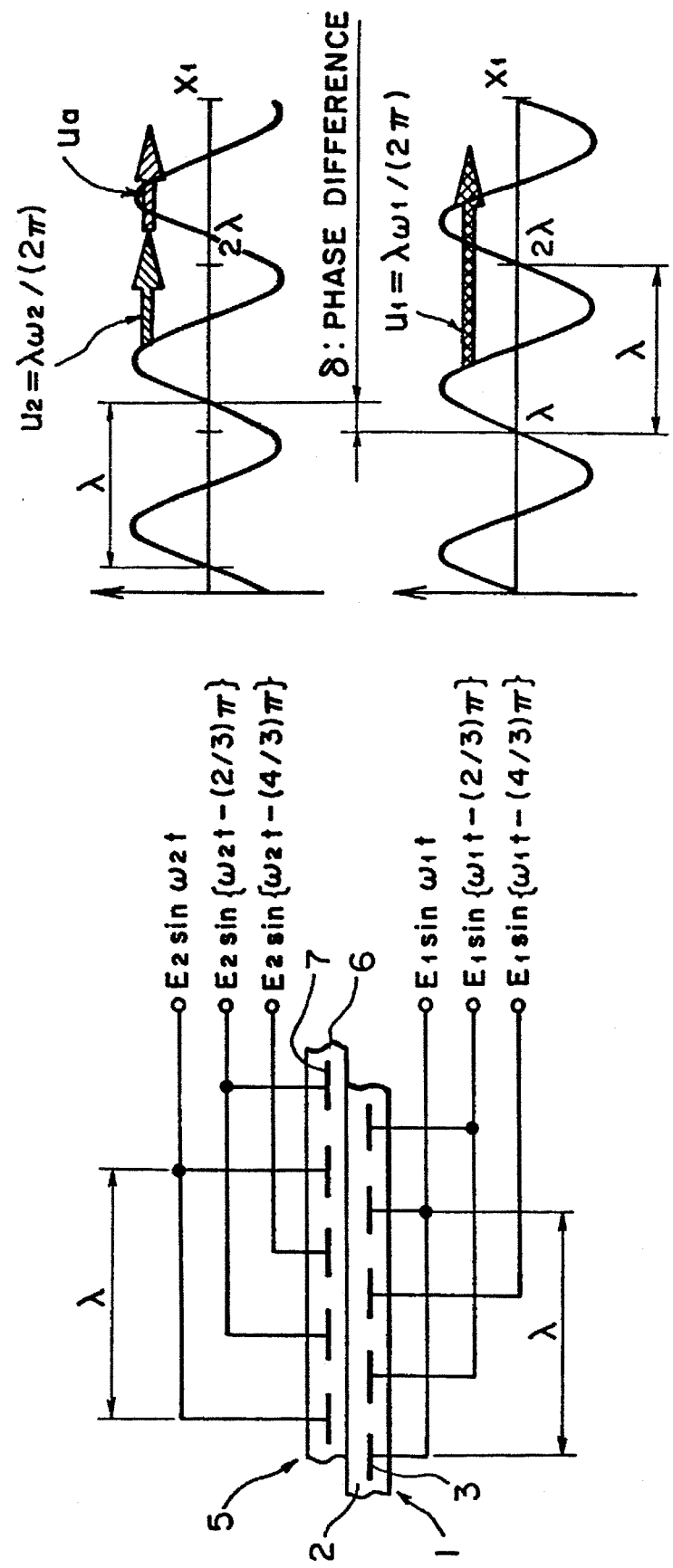
FIG. 2 is a diagram for describing applied voltages and traveling waves of potential in the electrostatic actuator of the first embodiment of the present invention.
Figure 3:
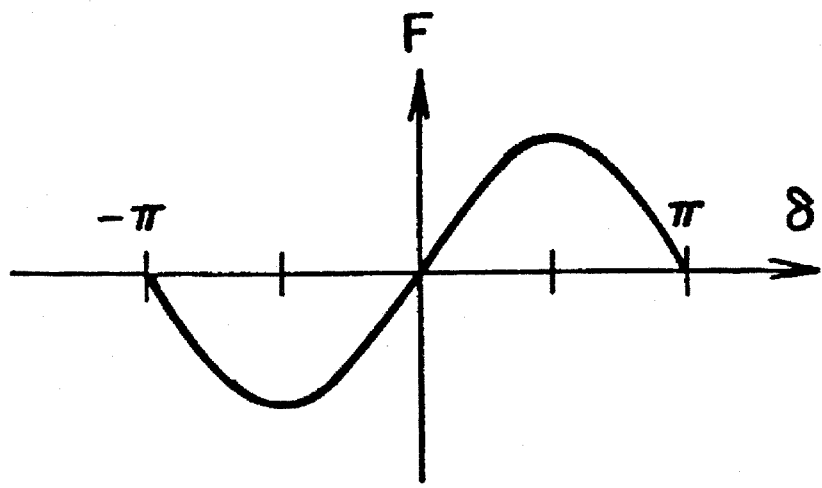
FIG. 3 is a diagram for describing an electrostatic force dependent upon a phase difference between the two waves on the stator and slider of the electrostatic actuator of the first embodiment of the present invention.
Figure 4:
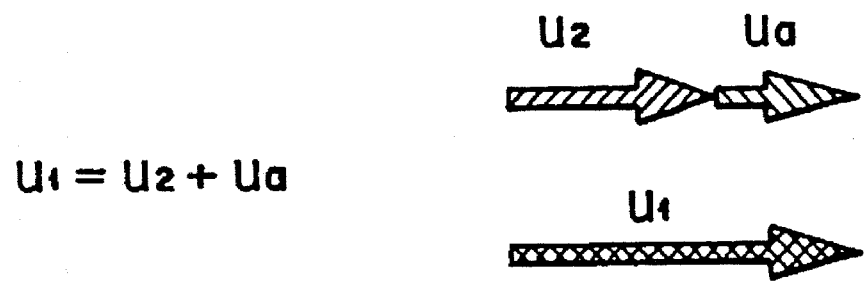
FIG. 4 is a diagram for describing the operating speed of the electrostatic actuator of the first embodiment of the present invention.

FIG. 1 is a partially broken away schematic perspective view illustrating a first embodiment of an electrostatic actuator according to the present invention, FIG. 2 is a diagram for describing applied voltages and traveling waves of potential in the electrostatic actuator of the first embodiment, FIG. 3 is a diagram for describing an electrostatic force dependent upon a phase difference between the two waves on the stator and slider, and FIG. 4 is a diagram for describing the operating speed of the electrostatic actuator.

As illustrated in FIGS. I and 2, a first member (stator) 1 comprises an insulator 2 and striped electrodes (hereinafter referred to as simply as "electrodes") 3 imbedded in the insulator 2. A second member (slider) 5 also comprises an insulator 6 and electrodes 7 imbedded in the insulator 6. A polyphase AC power supply 8 is connected to the electrodes 3 of the first member (stator) 1, and a polyphase AC power supply 9 is connected to the electrodes 7 of the second member (slider) 5, whereby the electrodes 3, 7 are supplied with polyphase AC voltage. That is, three-phase AC voltages are applied to respective ones of the electrodes 3 and 7. More specifically, voltages of $E_1 \sin\omega_1 t$, $E_1 \sin\{\omega_1 t-(\frac{2}{3})\pi\}$ and $E_1 \sin\{\omega_1 t-(\frac{4}{3})\pi\}$ are successively applied to the electrodes 3, where $\lambda$ represents wavelength and $\omega$ represents angular frequency. Similarly, voltages of $E_2 \sin\omega_2 t$, $E_2 \sin\{\omega_2 t-(\frac{2}{3})\pi\}$ and $E_2 \sin\{\omega_2 t-(\frac{4}{3})\pi\}$ are successively applied to the electrodes 7.

It should be noted that the spacing between electrodes here is 320 μm, and that a value three times this figure, namely the period of the three-phase electrodes, is represented by $\lambda$. As illustrated in FIG. 2, the electrodes of the first and second members are supplied with three-phase sinusoidal voltages having respective angular frequencies of $\omega_1$, $\omega_2$ (where $\omega_1 \neq \omega_2$). Though there is no particular limitation upon the frequencies of the applied sine waves, an amplitude on the order of 2000 V is desirable.

When such voltage is applied, the stator 1 and slider 5 develop traveling waves of wavelength $\lambda$, as illustrated in the drawings. Traveling velocities $u_1$, $u_2$ of these traveling waves are equal to $\lambda\omega_1/(2\pi)$ and $\lambda\omega_2/(2\pi)$, respectively, when viewed from the coordinate systems of the first member 1 and second member 5, respectively. A force F decided by the phase difference between these two traveling waves is produced between the first member 1 and second member 5, as illustrated in FIG. 3. As a result, the second member 5 moves if the first member 1 is held fixed.

If the load is constant, the phase difference $\delta$ between the two traveling waves is held constant. Accordingly, letting $u_a$ represent the driving velocity of the actuator, we have $u_1 = u_2 + u_a$, so that the driving velocity $u_a$ of the actuator is expressed by $u_a = u_1 - u_2$, as illustrated in FIG. 4.

Thus, by applying polyphase alternating currents having continuous waveforms to the electrodes of the first and second members, the first and second members develop two traveling waves exhibiting a phase difference on the basis of which a driving force can be obtained.

FIG. 5(a) is a diagram for describing the construction and operation of a second embodiment of an electrostatic actuator according to the present invention, and FIG. 5(b) is a diagram for describing traveling waves and driving velocity of this electrostatic actuator.

In this embodiment, a three-phase AC power supply 18 is connected to electrodes 13 imbedded in an insulator 12 of a first member (stator) 11, whereby three-phase voltage is applied. A four-phase AC power supply 19 is connected to electrodes 17 imbedded in an insulator 16 of a second member (slider) 15, whereby four-phase voltage is applied. The electrode spacing is 320 μm for the first member 11 and 240 μm for the second member 15.

Thus, the electrodes 13 of the first member (stator) 11 and the electrodes 17 of the second member (slider) 15 are respectively supplied with polyphase sinusoidal voltages so as to produce traveling waves. In FIG. 5(a), $v_1$, $v_2$ represent the oscillation frequencies of the traveling waves.

Thus, the spacing of the electrodes 17 of the second member is made ¾ that of the electrodes 13 of the first member, three-phase sine waves are applied to the electrodes 13 of the first member 11, and four-phase sine waves are applied to the electrodes 17 of the second member 15.

In this case, if we let $u_1$ represent the traveling velocity of a traveling wave 1 of the first member 11 and $u_2$ the traveling velocity of a traveling wave 2 of the second member 15, the driving velocity $u_a$ of the actuator will be expressed by $u_a = u_1 - u_2$.

FIG. 6(a) is a diagram for describing the construction and operation of an electrostatic actuator according to a third embodiment of the present invention, and FIG. 6(b) is a diagram for describing traveling waves and driving velocity of this electrostatic actuator.

In this embodiment, the three-phase AC power supply 18 is connected to the electrodes 13 imbedded in the insulator 12 of the first member 11, in a manner similar to that of the second embodiment described above, whereby the electrodes 13 are supplied with three-phase voltage.

As for the structure of electrodes 23 imbedded in an insulator 22 of a second member 21, two electrodes are deleted per period of the electrodes of the second member in the second embodiment [see FIG. 5(a)], a two-phase power supply 24 is connected to the electrodes 23 and two-phase AC voltage is applied to them.

More specifically, with respect to the spacing of the electrodes 13 of the first member 11, the electrodes 23 of the second member 21 include solely a first 20 electrode 23a per one period and a second electrode 23b at a ¼ electrode period. Three-phase sine waves are applied to the electrodes 13 of the first member 11, and two-phase sine waves are applied to the electrodes 23 of the second member 21.

In this case, if we let $u_1$ represent the traveling velocity of the traveling wave i of the first member 11 and $u_2$ the traveling velocity of the traveling wave 2 of the second member 21, the driving velocity $u_a$ of the actuator will be expressed by $u_a = u_1 - u_2$.

FIG. 7(a) is a diagram for describing the construction and operation of an electrostatic actuator according to a fourth embodiment of the present invention, and FIG. 7(b) is a diagram for describing traveling waves and driving velocity of this electrostatic actuator. Portions similar to those of the foregoing embodiments are designated by like reference numerals and need not be described again.

In this embodiment, the electrode spacing is 320 μm for both a first member 31 and a second member 35. Further, electrodes 33 imbedded in an insulator 32 of the first member 31 and electrodes 37 imbedded in an insulator 36 of the second member 35 are each connected to an inverter circuit 38 having a three-phase output. However, three-phase voltage of the positive-phase sequence ①-②-③ is applied to the electrodes 37 of the second member 35, and three-phase voltage of the negative-phase sequence ②-①-③ is applied to the electrodes 33 of the second member 31. In other words, it is so arranged that the traveling directions of the traveling waves induced by the first member 31 and second member 35 are opposite each other.

Accordingly, since the two traveling waves travel in opposite directions, the relation $u_2 = -u_1$ holds, where $u_l$ represents the traveling velocity of the traveling wave 1 of the first member 31 and $u_2$ the traveling velocity of the traveling wave 2 of the second member 35. As illustrated in FIG. 7(b), the driving velocity $u_a$ of the actuator is expressed by the equation $u_a = u_1 - u_2 = 2u_1 = 2\lambda v$.

Figure 8A:
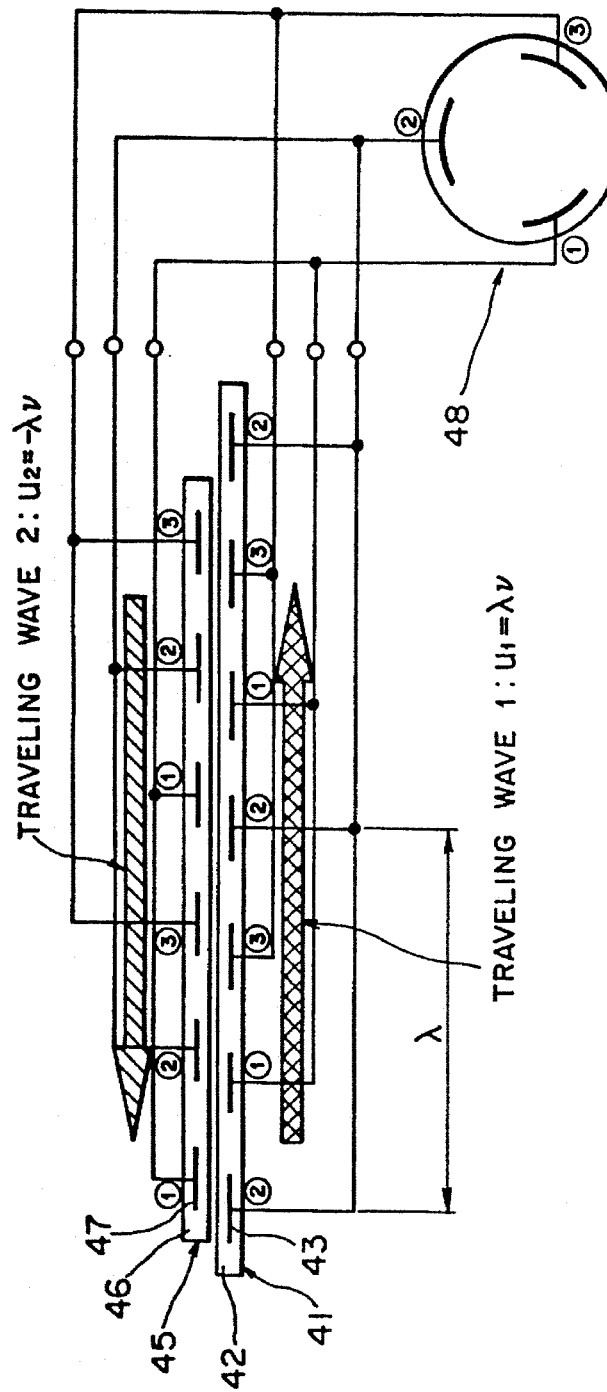
FIG. 8(a) is a diagram for describing the construction and operation of a fifth embodiment of an electrostatic actuator according to the present invention.
Figure 8B:
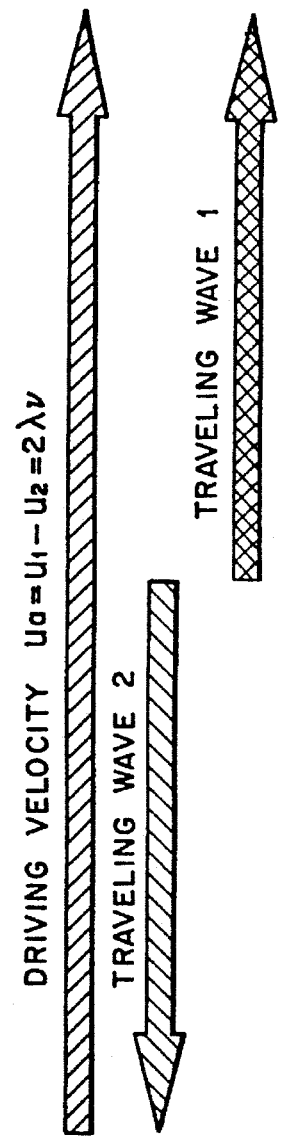
FIG. 8(b) is a diagram for describing traveling waves and driving velocity of the electrostatic actuator according to the fifth embodiment of the present invention.

FIG. 8(a) is a diagram for describing the construction and operation of an electrostatic actuator according to a fifth embodiment of the present invention, and FIG. 8(b) is a diagram for describing traveling waves and driving velocity of this electrostatic actuator. Portions similar to those of the foregoing embodiment are designated by like reference numerals and need not be described again.

In this embodiment, the electrode spacing is 320 μm for both a first member 41 and a second member 45, and the three-phase output inverter circuit 38 of the fourth embodiment shown in FIG. 7(a) is replaced by a commercial three-phase power supply 48. Electrodes 43 imbedded in an insulator 42 of the first member 41 and electrodes 47 imbedded in an insulator 46 of the second member 45 are each connected to the commercial three-phase power supply 48. Three-phase voltage of the positive-phase sequence ①-②-③ is applied to the electrodes 47 of the second member 45, and three-phase voltage of the negative-phase sequence ②-①-③ is applied to the electrodes 43 of the second member 41. In other words, it is so arranged that the traveling directions of the traveling waves induced by the first member 41 and second member 45 are opposite each other.

Accordingly, since the two traveling waves travel in opposite directions, the relation $u_2=-u_1$ holds, where $u_1$ represents the traveling velocity of the traveling wave 1 of the first member 41 and $u_2$ the traveling velocity of the traveling wave 2 of the second member 45. As illustrated in FIG. 8(b), the driving velocity $u_a$ of the actuator is expressed by equation $u_a=u_1-u_2=2u_1=2\lambda v$.

In this embodiment, the driving velocity is 96 mm/sec in eastern Japan, where the frequency of commercial power is 50 Hz.

Figure 9:
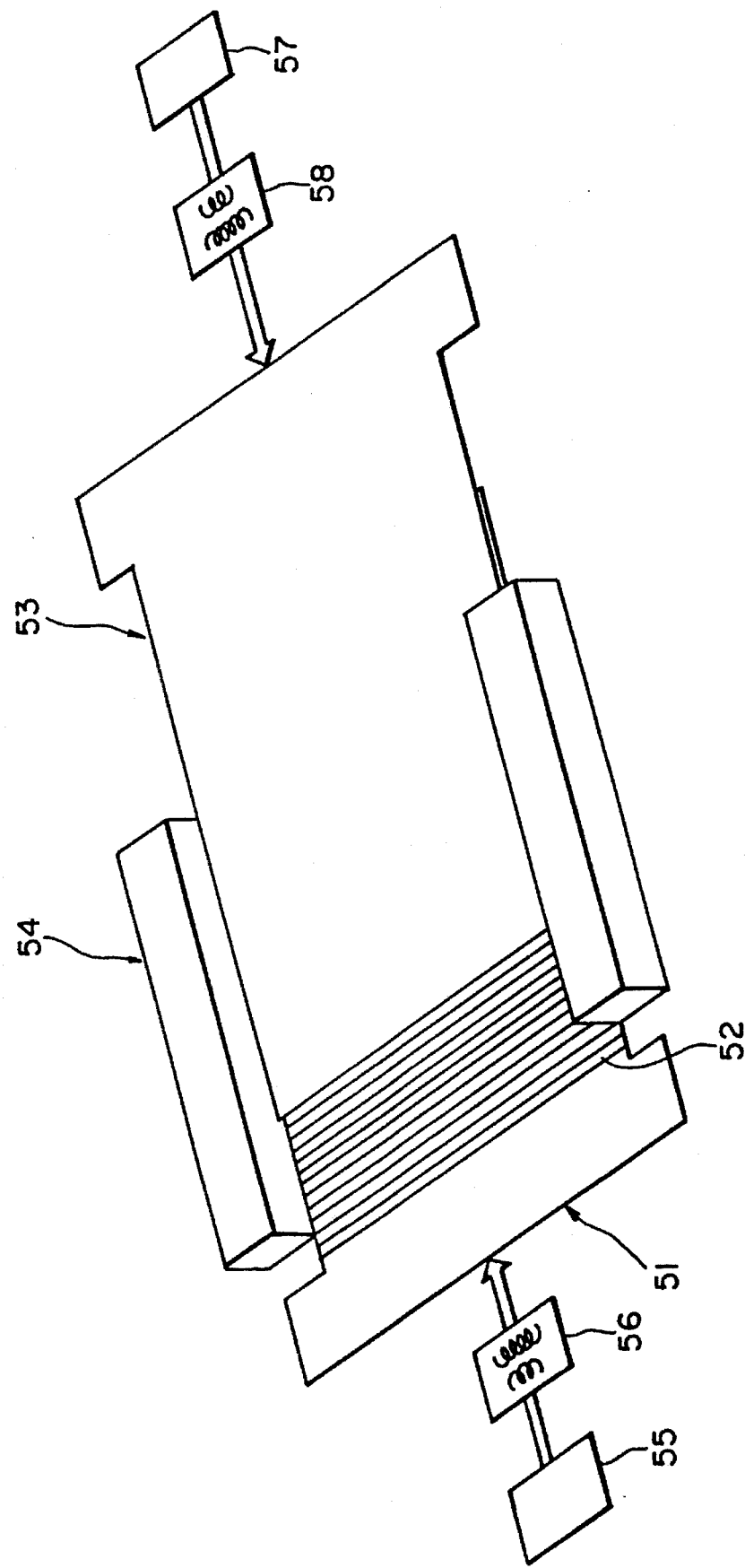
FIG. 9 is a perspective view showing the construction of a sixth embodiment of an electrostatic actuator according to the present invention.

FIG. 9 is a perspective view showing the construction of a sixth embodiment of an electrostatic actuator according to the present invention.

In this embodiment, striped electrodes 52 similar to those described above are formed on a stator 51 serving as the first member. A slider 53 serving as the second member is placed upon the stator 51, and striped electrodes (not shown) similar to those described above are formed on the slider 53. Further, guide members 54 are disposed on both sides of the slider 53 in order to guide the movement of the slider 53 smoothly.

The striped electrodes of the stator 51 and slider 53 are respectively supplied with three-phase AC power. For example, voltage from a three-phase AC power supply 55 is applied to the striped electrodes 52 of the stator 51 upon being transformed by a transformer 56, and voltage from a three-phase AC power supply 57 is applied to the striped electrodes (not shown) of the slider 53 upon being transformed by a transformer 58.

Figure 10:
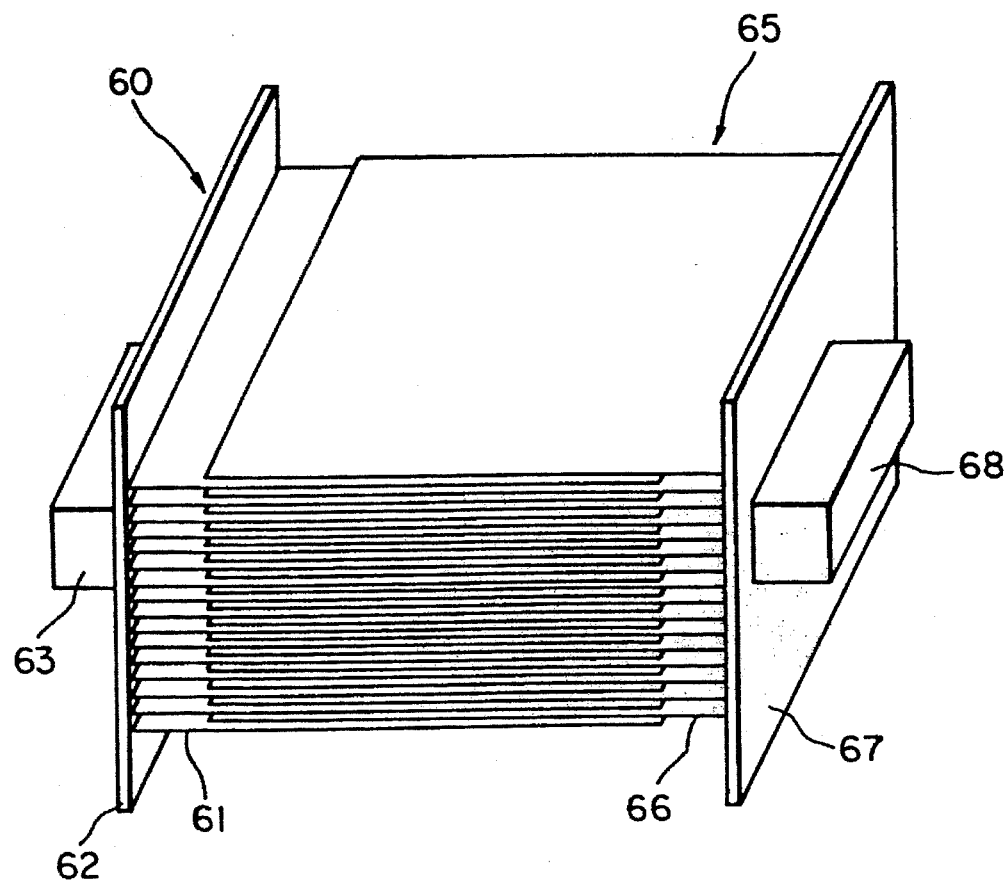
FIG. 10 is an external perspective view showing a seventh embodiment of an electrostatic actuator according to the present invention.

FIG. 10 is an external perspective view showing a seventh embodiment of an electrostatic actuator according to the present invention. Here actuators are stacked in order to increase the output of the actuators in the first through sixth embodiments described above.

In this embodiment, a stator 60 serving as the first member comprises a plurality of stacked stator elements 61, which are integrated by a connecting body 62. A polyphase AC power supply (not shown) is connected to the electrodes (not shown) of the stator elements 61. By way of example, a container 63 may be provided on the base side of the connecting body 62 and made to internally house the polyphase AC power supply.

Further, a slider 65 serving as the second member comprises a plurality of stacked slider elements 66, which are integrated by a connecting body 67. The slider elements 66 are interleaved with the stator elements 61. A polyphase AC power supply (not shown) is connected to the electrodes (not shown) of the slider elements 66. By way of example, a container 68 may be provided on the base side of the connecting body 67 and made to internally house this polyphase AC power supply.

Figure 11:
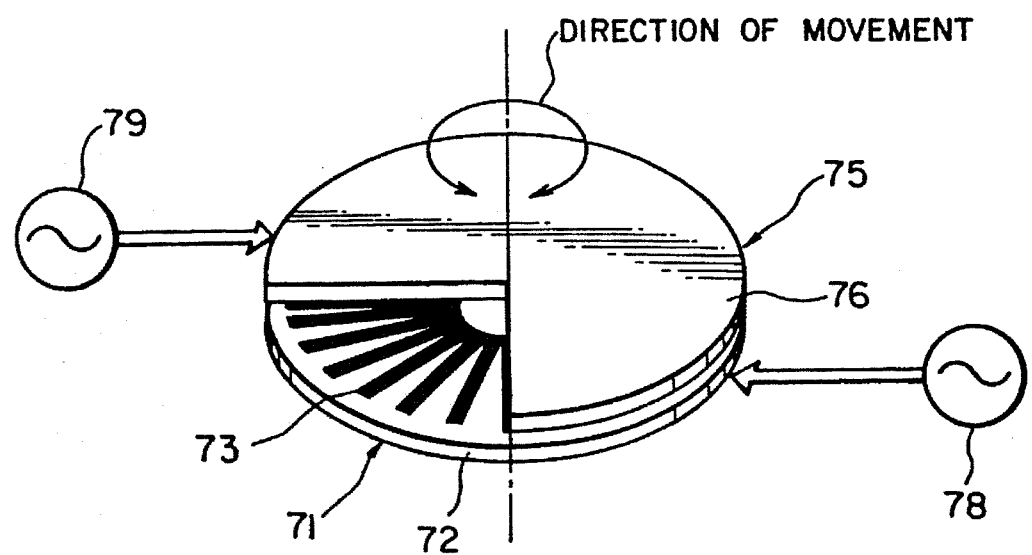
FIG. 11 is a partially broken away perspective view illustrating an eighth embodiment of an electrostatic actuator according to the present invention.

FIG. 11 is a partially broken away perspective view illustrating an eighth embodiment of an electrostatic actuator according to the present invention.

As shown in FIG. 11, a disk-shaped stator 71 serving as the first member comprises an insulator 72 and striped electrodes 73, which are arranged in radiating fashion, formed by being imbedded in the insulator 72. A disk-shaped slider 75 serving as the second member is provided so as to oppose the disk-shaped stator 71 in coaxial relation with respect thereto. Striped electrodes (not shown) arranged in radiating fashion are formed on a disk-shaped insulator 76 of the slider 75 in opposition to the striped electrodes 73 arranged in radiating form on the disk-shaped stator 71.

A polyphase AC power supply 78 is connected to the striped electrodes 73 arranged in radiating form on the stator 71, and a polyphase AC power supply 79 is connected to the striped electrodes (not shown) arranged in radiating form on the slider 75. By thus applying polyphase AC voltage to the radiating striped electrodes, the disk-shaped slider 75 can be driven into rotation.

Figure 12:
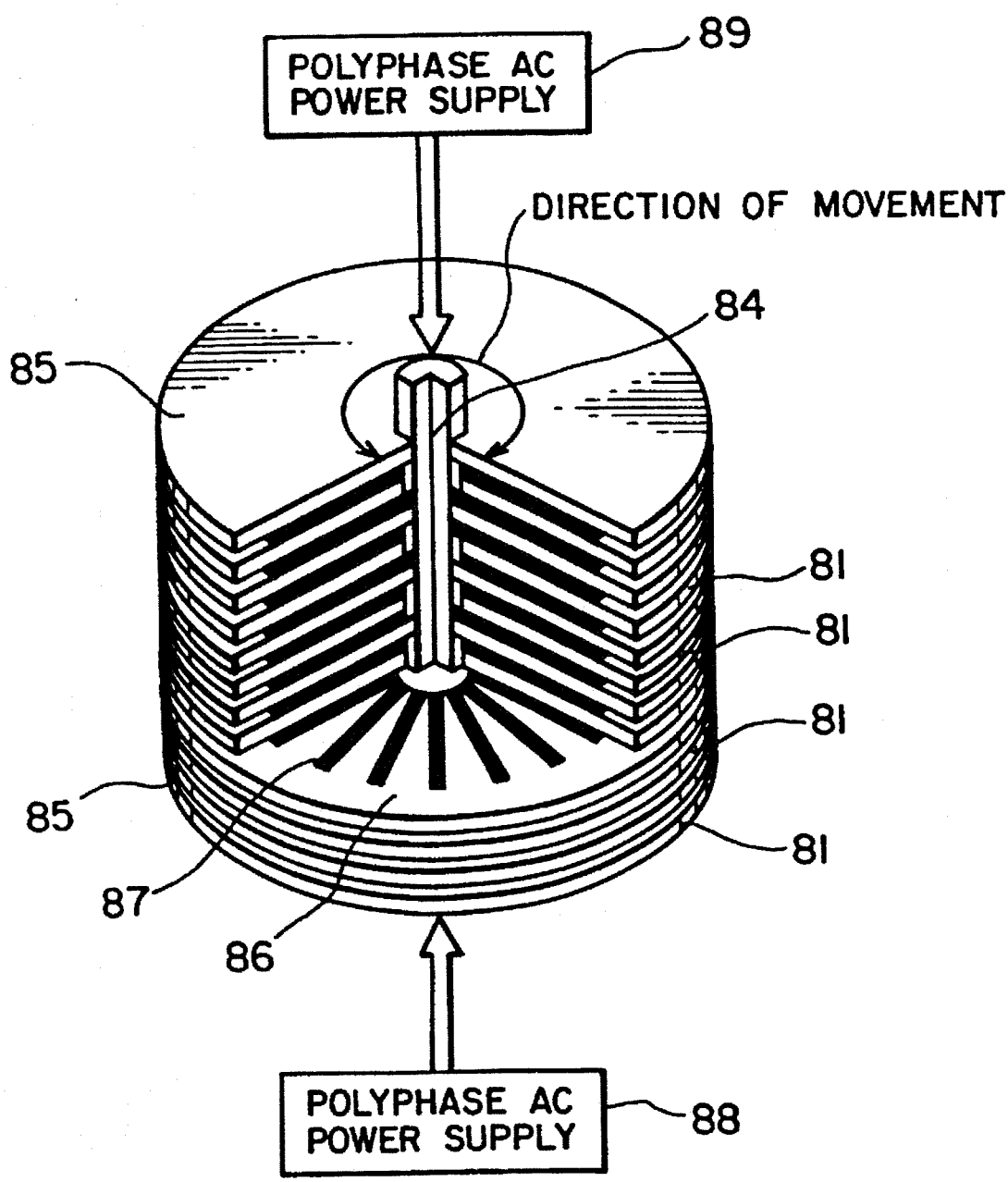
FIG. 12 is a partially broken away perspective view illustrating a ninth embodiment of an electrostatic actuator according to the present invention.

FIG. 12 is a partially broken away perspective view illustrating a ninth embodiment of an electrostatic actuator according to the present invention.

In this embodiment, a shaft 84 is implanted in the central portion of each of a number of disk-shaped stators 81 serving as the first member, a number of disk-shaped sliders 85 serving as the second member are provided about the shaft 84 as the center, and the stators 81 and sliders 85 are interleaved so as to form multiple layers.

As in the manner described above, the stators 81 and sliders 85 are provided with striped electrodes 87, which are arranged in radiating form in a disk-shaped insulator 86, in such a manner that the striped electrodes on the stators 81 will oppose the striped electrodes on the sliders 85. These electrodes are supplied with polyphase AC voltage from respective polyphase AC power supplies 88 and 89.

By adopting this arrangement, actuator output can be enlarged.

Figure 13:
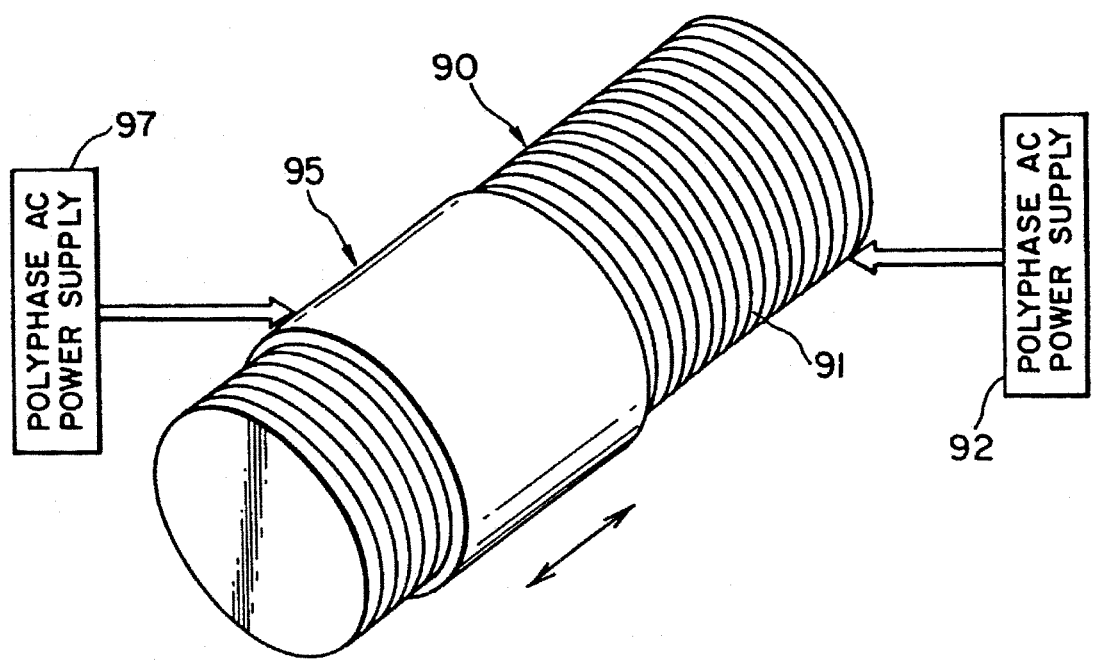
FIG. 13 is a perspective view illustrating a tenth embodiment of an electrostatic actuator according to the present invention.

FIG. 13 is a perspective view illustrating a tenth embodiment of an electrostatic actuator according to the present invention.

In this embodiment, as shown in FIG. 13, a plurality of winding-shaped electrodes 91, which are insulated from one another and provided in a prescribed direction with a prescribed spacing between them, are formed on a stator 90 serving as a cylindrical member. A slider 95 serving as a tubular member is loosely fitted on the stator 90, and winding-shaped electrodes (not shown) similar to the electrodes 91 described above are formed on the slider 95. Polyphase AC power supplies 92, 97 similar to those described above are respectively connected to the winding-shaped electrodes 91 of the stator 90 and to the winding-shaped electrodes (not shown) of the slider 95, whereby these electrodes are supplied with polyphase AC voltage.

An electrostatic Coulomb force is produced between the stator 90 and slider 95 so that the slider 95 is driven slidably along the axial direction of the stator 90, namely the direction indicated by the arrows, in the manner described earlier.

In this case, no special guiding means need be provided for guiding the slider 95, and therefore the construction of the actuator is simplified.

Figure 14:
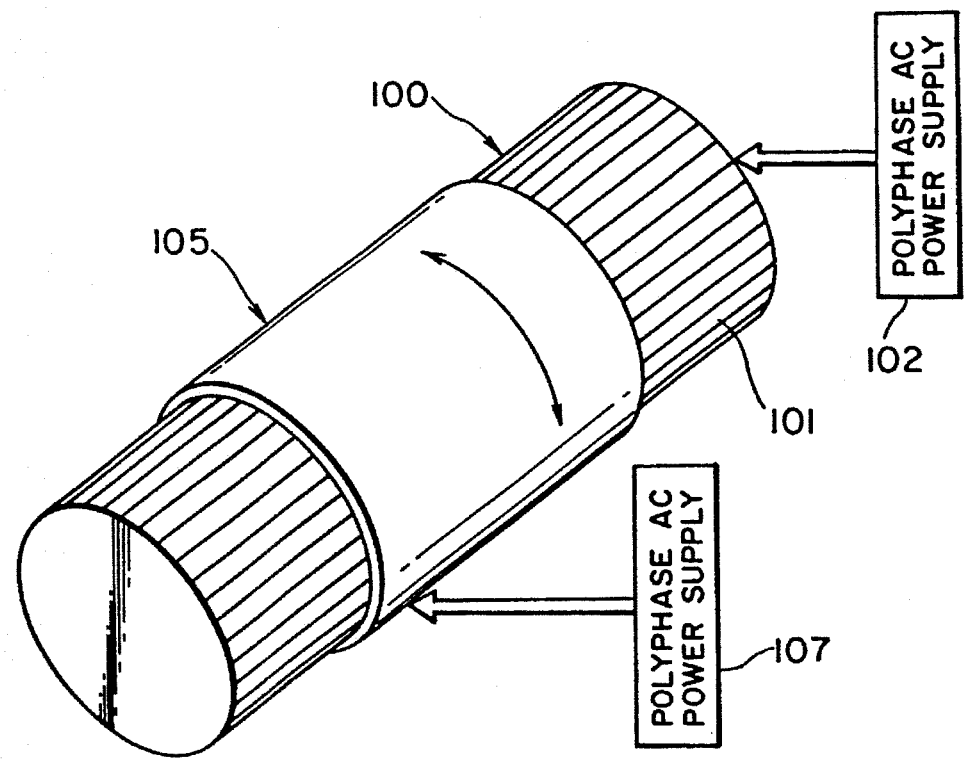
FIG. 14 is a perspective view illustrating an 11th embodiment of an electrostatic actuator according to the present invention.

FIG. 14 is a perspective view illustrating an 11th embodiment of an electrostatic actuator according to the present invention.

In this embodiment, as shown in FIG. 14, a plurality of axially extending striped electrodes 101, which are insulated from one another and provided in a prescribed direction with a prescribed spacing between them, are formed on a stator 100 serving as a cylindrical member. A slider 105 serving as a tubular member is loosely fitted on the stator 100, and axially extending striped electrodes (not shown) similar to those described above are formed on the slider 105. Polyphase AC power supplies 102 and 107 are respectively connected to the striped electrodes 101 of the stator 100 and to the axially extending striped electrodes (not shown) of the slider 105, whereby these electrodes are supplied with polyphase AC voltage.

An electrostatic Coulomb force is produced between the stator 100 and slider 105 so that the slider 105 is driven rotatively in the manner indicated by the arrows.

Electrostatic actuators according to the present invention can be configured in the following ways as well:

(1) Commercial AC power supplies, especially three-phase AC power supplies, can be used as the power supplies of the electrostatic actuator according to the present invention. Since commercial power supplies can be used at locations where such power is available, it is unnecessary to provide special AC power supplies for the electrostatic actuator and the cost of the system can be reduced as a result. Further, the values of voltage impressed upon the electrostatic actuator can be adjusted at will using a transformer.

(2) In cases where the electrostatic actuator is mounted on a vehicle or used at remote places, AC generators can be used as the power supplies for the electrostatic actuator of the present invention.

(3) By designing the electrodes of the first member and the electrodes of the second member to have identical structures, manufacturing cost can be reduced.

The present invention is not limited to the foregoing embodiments but can be modified in various ways based upon the gist of the invention, and these modifications do not depart from the scope of the claims.

In accordance with the present invention, as described in detail above, the following effects are obtained:

(1) Since an electrostatic repulsive force is produced between the first and second members, friction is reduced by this repulsive force even when the first and second members are in a contacting state. This makes it possible to drive the actuator without provision of a lubricating mechanism.

In particular, by applying continuous-waveform polyphase alternating current to the electrodes of the first member and the electrodes of the second member, two traveling waves of different phases are produced in the first and second members without special provision of an alignment mechanism, and one or both of the first and second members can be driven strongly based upon the phase difference.

Accordingly, the actuator can be simplified in construction and made lighter in weight.

(2) The electrostatic actuator can be driven by applying continuous waveforms to the electrodes of the first member and the electrodes of the second member. The power consumed in generating the sinusoidal waves can be reduced by utilizing a resonance circuit, inverter circuit or the like, and this can be made to approach the mechanical energy generated by the actuator.

(3) By directly driving the electrostatic actuator using commercial three-phase power supplies, there is absolutely no need for high-voltage direct current and auxiliary equipment such as high-voltage switches. This makes it possible to simplify the construction of the actuator system and to lower the cost of the system.

(4) The electrostatic actuator can be controlled efficiently through a simple arrangement without sacrificing the special qualities of the electrostatic actuator.

What is claimed is:

1. An electrostatic actuator comprising:
   (a) a first disk-shaped member having a plurality of striped electrodes insulated from one another and arranged in a radiating form with a prescribed spacing between them;
   (b) a second disk-shaped member having a plurality of striped electrodes insulated from one another and arranged in a radiating form with a prescribed spacing between them; and
   (c) continuous-waveform polyphase AC power supplies having fixed frequencies applied to the plurality of striped electrodes arranged in radiating form on said first disk-shaped member and the plurality of striped electrodes arranged in radiating form on said second disk-shaped member so as to produce different traveling potential waves in said respective first and second disk-shaped members;
   (d) at least one of said first disk-shaped member and said second disk-shaped member being rotatively moved by a driving force generated by an electrostatic Coulomb force between the different traveling potential waves of said first disk-shaped member and said second disk-shaped member.

2. The electrostatic actuator according to claim 1, wherein a plurality of said first disk-shaped members and a plurality of said second disk-shaped members are supported by a central shaft and stacked in an interleaved manner.

3. An electrostatic actuator as claimed in claim 1 wherein said continuous-waveform polyphase AC power supplies produce traveling potential waves of different velocities in said respective first and second disk-shaped members.

4. An electrostatic actuator as claimed in claim 1 wherein said continuous-waveform polyphase AC power supplies produce traveling potential waves in different directions in said respective first and second disk-shaped members.

5. An electrostatic actuator comprising:
   (a) a cylindrical member having a plurality of winding-shaped electrodes insulated from one another and arranged in a prescribed direction with a prescribed spacing between them;
   (b) a tubular member disposed coaxially with respect to said cylindrical member and having a plurality of winding-shaped electrodes insulated from one another and arranged in a prescribed direction with a prescribed spacing between them; and
   (c) continuous-waveform polyphase AC power supplies having fixed frequencies applied to the plurality of winding-shaped electrodes on said cylindrical member and the plurality of winding-shaped electrodes on said tubular member so as to produce different traveling potential waves in said respective cylindrical and tubular members;
   (d) at least one of said cylindrical member and said tubular member being slidably moved by a driving force generated by an electrostatic Coulomb force between the different traveling potential waves of said cylindrical member and said tubular member.

6. An electrostatic actuator as claimed in claim 5 wherein said continuous-waveform polyphase AC power supplies produce traveling potential waves of different velocities in said respective cylindrical and tubular members.

7. An electrostatic actuator as claimed in claim 5 wherein said continuous-waveform polyphase AC power supplies produce traveling potential waves in different directions in said respective cylindrical and tubular members.

8. An electrostatic actuator comprising:

(a) a cylindrical member having a plurality of axially extending striped electrodes insulated from one another and arranged in a prescribed direction with a prescribed spacing between them;

(b) a tubular member disposed coaxially with respect to said cylindrical member and having a plurality of axially extending striped electrodes insulated from one another and arranged in a prescribed direction with a prescribed spacing between them; and (c) continuous-waveform polyphase AC power supplies having fixed frequencies applied to the plurality of striped electrodes on said cylindrical member and the plurality of striped electrodes on said tubular member so as to produce different traveling potential waves in said respective cylindrical and tubular members;

(d) at least one of said cylindrical member and said tubular member being rotatively moved by a driving force generated by an electrostatic Coulomb force between the different traveling potential waves in said cylindrical member and said tubular member.

9. An electrostatic actuator as claimed in claim 8 wherein said continuous-waveform polyphase AC power supplies produce traveling potential waves of different velocities in said respective cylindrical and tubular members.

10. An electrostatic actuator as claimed in claim 8 wherein said continuous-waveform polyphase AC power supplies produce traveling potential waves in different directions in said respective cylindrical and tubular members.

* * * * *

UNITED STATES PATENT AND TRADEMARK OFFICE
CERTIFICATE OF CORRECTION

PATENT NO. : 5,541,465
DATED : July 30, 1996
INVENTOR(S) : HIGUCHI et al

It is certified that error appears in the above-indentified patent and that said Letters Patent is hereby corrected as shown below:

Col. 1, line 42, "iS" should read --is--.
Col. 5, line 13, after "angular" insert --fixed--.
Col. 6, line 17, delete "20"; and
    line 23, delete "i" insert --1--.

Signed and Sealed this

Twenty-fifth Day of March, 1997

Attest:

BRUCE LEHMAN

Attesting Officer    Commissioner of Patents and Trademarks